United States Patent
Zeuch et al.

(10) Patent No.: US 9,831,715 B2
(45) Date of Patent: Nov. 28, 2017

(54) ENERGY SUPPLY MODULE AS A TWO-PORT NETWORK, USE OF A SEPARATING DEVICE IN SUCH AN ENERGY SUPPLY MODULE, AND METHOD FOR OPERATING SUCH AN ENERGY SUPPLY MODULE

(71) Applicant: PHOENIX CONTACT GMBH & CO. KG, Blomberg (DE)

(72) Inventors: Jochen Zeuch, Blomberg (DE); Michael Heinemann, Lage (DE); Hartmut Henkel, Blomberg (DE)

(73) Assignee: Phoenix Contact GMBH & Co. KG, Blomberg (DE)

( * ) Notice: Subject to any disclaimer, the term of this patent is extended or adjusted under 35 U.S.C. 154(b) by 456 days.

(21) Appl. No.: 14/398,451

(22) PCT Filed: May 2, 2013

(86) PCT No.: PCT/EP2013/059182
§ 371 (c)(1),
(2) Date: Nov. 1, 2014

(87) PCT Pub. No.: WO2013/164421
PCT Pub. Date: Nov. 7, 2013

(65) Prior Publication Data
US 2015/0084424 A1    Mar. 26, 2015

(30) Foreign Application Priority Data
May 3, 2012  (DE) .................. 10 2012 103 904

(51) Int. Cl.
*H02J 9/06* (2006.01)
*H02H 3/06* (2006.01)
(Continued)

(52) U.S. Cl.
CPC ............. *H02J 9/06* (2013.01); *H02H 3/066* (2013.01); *H02H 3/087* (2013.01); *H02H 3/093* (2013.01);
(Continued)

(58) Field of Classification Search
USPC ............................................. 307/66
See application file for complete search history.

(56) References Cited

U.S. PATENT DOCUMENTS

| 4,492,676 A | 1/1985 | Colbert et al. |
| 5,654,859 A | 8/1997 | Shi |

(Continued)

FOREIGN PATENT DOCUMENTS

| DE | 199 21 146 A1 | 11/1999 |
| DE | 20 2004 020 401 U1 | 6/2005 |

(Continued)

OTHER PUBLICATIONS

Office Action issued by the Japan Patent Office (JPO), dated Jan. 15, 2016, in Japanese Patent Application No. 2015-509445, including English language translation thereof; 8 pgs.

(Continued)

*Primary Examiner* — Rexford Barnie
*Assistant Examiner* — Xuan Ly
(74) *Attorney, Agent, or Firm* — Knobbe Martens Olson & Bear, LLP

(57) ABSTRACT

The invention relates to an energy supply module (1) comprising an input gate (2) for connection to a power source (4) and an output gate (3) as an interruption-free power supply, wherein the input gate (2) and the output gate (3) are through-connected separably via an electrical separating device (6), and an auxiliary energy source (10) is connected or can be connected in parallel with the input gate (2) and the output gate (3), wherein the separating device (6) is posi- (Continued)

Figure 1:
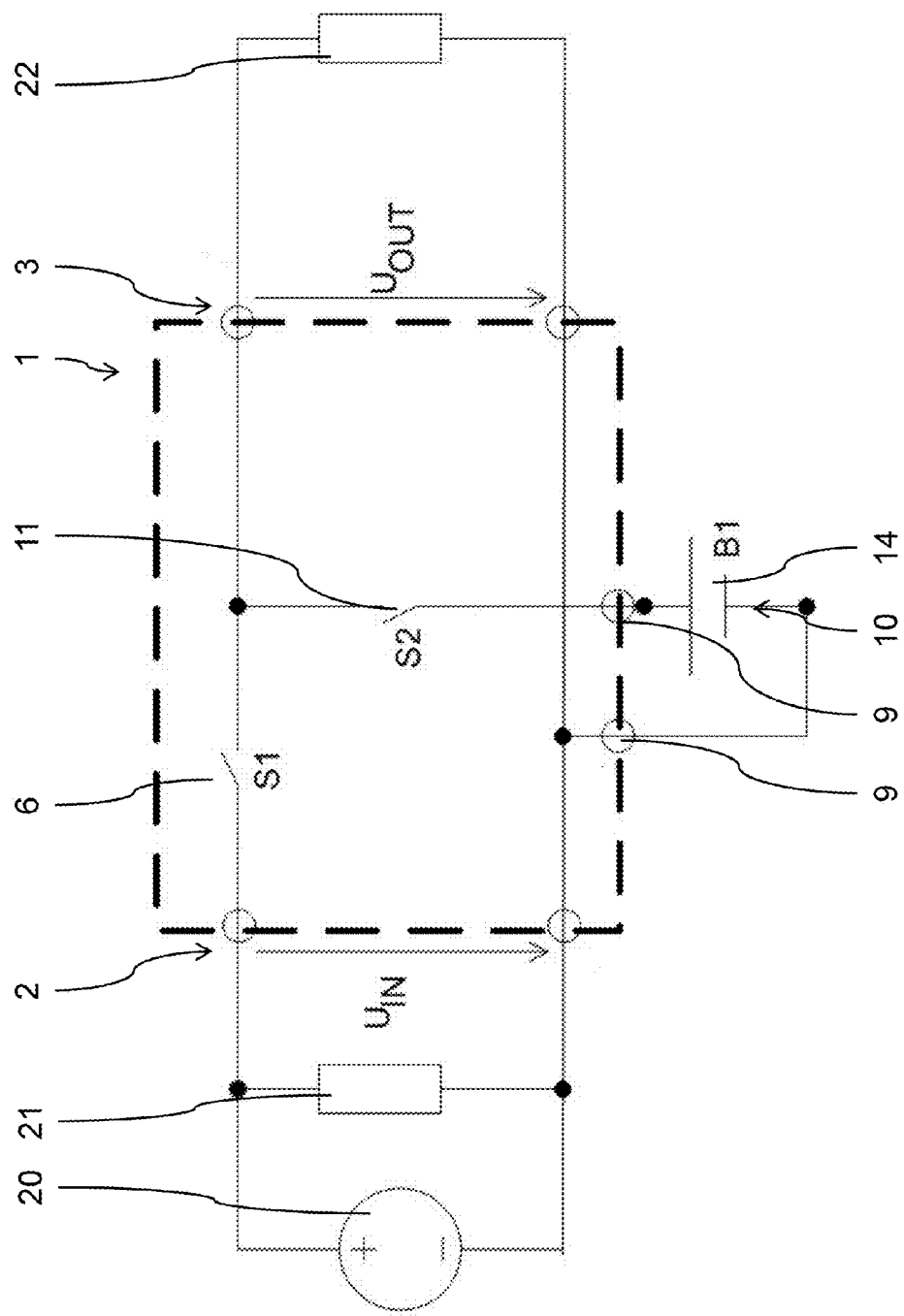

tioned between the auxiliary energy source (10) and the input gate (2), and the separating device (6) comprises a circuit arrangement having two transistors (15) and two diodes (16), wherein the transistors (15) are connected reversely in series, and a diode (16) is connected to each transistor (15), inversely to the current direction of said diode.

20 Claims, 11 Drawing Sheets

(51) Int. Cl.
*H02H 3/087* (2006.01)
*H02H 3/093* (2006.01)

(52) U.S. Cl.
CPC ......... *H02J 9/061* (2013.01); *H02J 2009/068* (2013.01); *Y10T 307/615* (2015.04); *Y10T 307/625* (2015.04)

(56) References Cited

U.S. PATENT DOCUMENTS

| | | | |
|---|---|---|---|
| 6,052,291 A | 4/2000 | Suzuki et al. | 363/21 |
| 7,872,373 B2 | 1/2011 | Henkel et al. | |
| 2001/0020802 A1 | 9/2001 | Kitagawa et al. | |
| 2002/0039034 A1 | 4/2002 | Kohda | |
| 2002/0135235 A1* | 9/2002 | Winick | H02J 1/102 307/87 |
| 2007/0262651 A1 | 11/2007 | Odaohara | |
| 2010/0066431 A1 | 3/2010 | Carter | |
| 2010/0231048 A1 | 9/2010 | Chen et al. | |
| 2011/0227640 A1 | 9/2011 | Kyono | |
| 2011/0234151 A1 | 9/2011 | Uan-Zo-Li et al. | 320/107 |
| 2013/0026991 A1* | 1/2013 | Roessler | H02J 7/0016 320/116 |

FOREIGN PATENT DOCUMENTS

| | | | |
|---|---|---|---|
| DE | 10 2005 027 211 A1 | | 12/2006 |
| JP | 02-159935 | | 6/1990 |
| JP | 09-107639 | | 4/1997 |
| JP | 11-196541 | | 7/1999 |
| JP | 2002-315182 | | 10/2002 |
| JP | 2004-032966 | | 1/2004 |
| JP | 2005-124275 | | 5/2005 |
| JP | 2005-312100 | | 11/2005 |
| JP | 2007 209195 A | | 8/2007 |
| JP | 2007209195 | * | 8/2007 |
| JP | 2007-306647 A | | 11/2007 |

OTHER PUBLICATIONS

Office Action received in German counterpart application No. 10-2012-103-904.6, dated Jan. 16, 2013, 5 pgs.

Office action dated Jun. 8, 2015, received from the German Patent Office (GPTO) in related German patent application DE10-2012-103-904.6; 5 pgs.

Office Action received in German counterpart application No. 10 2012 103 904.6, dated Oct. 21, 2015, 5 pages..

* cited by examiner

| Switch state | V1 | V2 | D1 | D2 |
|---|---|---|---|---|
| Bidirectionally blocking | Blocked | Blocked | X | X |
| Unidirectionally conductive from 121 to 122 | Conductive | Blocked or X | X | Conductive |
| Unidirectional conductive from 122 to 121 | Blocked or X | Conductive | Conductive | X |
| Bidirectionally conductive, low loss | Conductive | Conductive | X | X |

States of the switches V1, V2, D1 and D2
X = don't care (current flows through FET, not diode or not at all)

FIG. 4

ENERGY SUPPLY MODULE AS A TWO-PORT NETWORK, USE OF A SEPARATING DEVICE IN SUCH AN ENERGY SUPPLY MODULE, AND METHOD FOR OPERATING SUCH AN ENERGY SUPPLY MODULE

CROSS REFERENCE TO RELATED APPLICATIONS

This application is a U.S. National Stage Application of International Application No. PCT/EP2013/059182 filed May 2, 2013, published as W)2013/164421A1, which claims priority from German Patent Application No. 10 2012 103 904.6 filed May 3, 2012, which are incorporated herein by reference in entirety.

The present invention relates to an energy supply module comprising an input gate for connection to a power source and an output gate as an interruption-free power supply, wherein the input gate and the output gate are through-connected separably via an electrical separating device, and an auxiliary energy source is connected or can be connected in parallel with the input gate and the output gate, wherein the separating device is positioned between the auxiliary energy source and the input gate. The present invention also relates to a use of a separating device in such an energy supply module and also to a method for operating such an energy supply module.

Energy supply modules of this type are connected at the input gate thereof to a supply line, which is fed from the power source, such that consumers arranged after the output gate of the energy supply module are supplied with energy by the energy supply module in the case of a fault of the power source. Consumers connected to the supply line between the power source and the input gate of the energy supply module are only supplied by the power source due to the position of said consumers. A distinction is thus easily possible between consumers of which the operation does not have to be maintained in the case of a fault of the power source and consumers that are to continue to be operated, without having to provide two power sources with corresponding power supply lines. Accordingly, the energy supply module can be formed in a simple manner and with a small auxiliary energy source, since only some of the consumers connected to the power source have to be supplied with power.

The separating device is necessary for the function of the energy supply module as an interruption-free power supply and separates the energy supply module from the power source on the input side in the case of a fault of the power source. The consumers connected to the output gate can thus be supplied by the auxiliary energy source without current from the energy supply module being delivered to other consumers.

In the prior art, the separating device is formed as a diode, for example. In the case of a fault of the power source, the diode automatically prevents current from the auxiliary energy source from flowing in the direction of the power source and therefore to consumers that are not still to be supplied with power. However, a voltage drop of approximately 0.7 V occurs at the diode and leads to corresponding losses at the diode. The diode performs an automatic separation of the input gate and output gate.

In order to reduce the losses, it is also known to form the separating device with a transistor, which is actuated by a control device. As soon as a fault of the power source is identified by the control device, the transistor is connected in a blocking manner, such that a flow of current between the power source and the output gate or the auxiliary current source of the energy supply module is prevented. During operation, the losses at the separating device are reduced further by the use of a field-effect transistor, since the power loss is dependent only on the drain source resistance, which is comparatively small in the case of field-effect transistors. This principle corresponds to a synchronous rectification. With the embodiment of the separating device with such a transistor, a rapid connection of the transistor is necessary in order to suppress compensating currents in the energy supply module in the case of fluctuations of the input voltage or highly inductive power sources. The occurrence of harmonics, for example due to load change of the connected consumers, may also cause temporary voltage changes, which require a rapid connection of the transistor. The method for operating the energy supply module therefore requires a frequent, rapid connection of the separating device, whereby the actuation is complex.

A disadvantage of the previously described energy supply modules is that there is no delimitation of the input current provided by the power source. With a short circuit on the output side, the total input energy is guided via the separating device, which may signify considerable losses. In particular in the case of a hard short circuit, the remaining voltage at the input gate may be so low that consumers between the input gate of the energy supply module and the power source can no longer be supplied with energy and switch off. The actuation voltage of the field-effect transistor may also break down and may no longer be high enough to connect this transistor through completely.

With the use of a separating device having a combination of the field-effect transistor with a diode, or in linear operation, large losses also occur, which leads to an increased cooling demand.

Proceeding from the above-mentioned prior art, the object of the present invention is therefore to specify an energy supply module of the above-mentioned type, with which low losses occur in particular at the separating device, which causes a rapid and/or automatic actuation of the separating device when the input voltage drops, and which prevents feedback effects of faults on the side of the output gate of said energy supply module to the side of the input gate of said energy supply module. In addition, a method for operating the energy supply module is to be specified, which enables a simple and efficient actuation of the separating device.

The object is achieved in accordance with the invention by the features of the independent claims. Advantageous embodiments of the invention are specified in the dependent claims.

In accordance with the invention, an energy supply module comprising an input gate for connection to a power source and comprising an output gate as an interruption-free power supply is thus specified, wherein the input gate and the output gate are through-connected separably via an electrical separating device, and an auxiliary energy source is connected or can be connected in parallel with the input gate and the output gate, wherein the separating device is positioned between the auxiliary energy source and the input gate, wherein the separating device comprises a circuit arrangement having two transistors and two diodes, wherein the transistors are connected reversely in series, and a diode is connected to each transistor, inversely to the current direction of said diode.

The basic concept of the present invention is thus, by means of the use of the circuit arrangement comprising the two transistors and diodes, to produce a separating device that has low losses and limits a current at the input gate. On the one hand, an overload of a power source, to which the energy supply module is connected via the input gate thereof, is prevented, and on the other hand it is ensured that consumers connected between the power source and the input gate can continue to be supplied with energy in the case of faults at the output gate of the energy supply module in order to maintain the operation of said consumers. Accordingly, the energy supply module can also be supplied continuously with energy on the input side as a consumer in order to maintain the operation of the separating device, since an actuation voltage of the field-effect transistors is also maintained in order to connect these through fully. The separating device can respond quickly to voltage fluctuations at the input gate and/or the output gate, such that a reliable energy supply module is formed. The circuit arrangement can be operated in four different operating modes by the transistors connected reversely in series. In a bidirectionally blocking mode, both transistors perform a blocking function, and also no current can flow via the two diodes. In a bidirectionally conductive mode, both transistors are connected conductively, such that a current flow through the separating device is possible in both directions with low loss. In this case, the current flows via the transistors and not via the diodes. In a unidirectionally conductive mode, one of the transistors is connected conductively and the other is blocked. Accordingly, a flow of current is provided in the current direction of the diode arranged inversely to the blocked transistor, via this diode and the other transistor. The circuit arrangement thus makes it possible to interrupt the input current. If a predefined peak current is exceeded across the circuit arrangement, a consumer connected to the output gate can be switched off. A soft start or hot plugging is also possible. The separating device can be positioned in the energy supply module at any of the contacts of the input gate. Due to the reversed series connection of the transistors, the circuit arrangement can be arbitrarily arranged and positioned in the energy supply module. By way of example, the auxiliary energy source may comprise a battery.

In accordance with a preferred embodiment of the invention, the transistors are formed as bipolar transistors or field-effect transistors. The selection of the transistors is irrelevant in principle for the circuit arrangement, such that a configuration with bipolar transistors or field-effect transistors, referred to as FETs for short, can be implemented. The bipolar transistors may both be NPN or PNP transistors selectively. Accordingly, the field-effect transistors may both be formed as N-channel or P-channel FETs. For the separating device, it is irrelevant whether the transistors are connected at the drain or source connections thereof.

In accordance with a further embodiment of the invention, the auxiliary energy source comprises a rechargeable energy store, and the energy supply module is configured to charge the energy store via the input gate. The energy supply module can thus be operated autonomously, without having to connect a further power source or exchange an energy store. Accordingly, a charging apparatus or discharging apparatus can be provided for the charging and/or discharging of the energy store in order to limit a charging or discharging current respectively and/or to terminate the discharging of the energy store in the event that a predefined energy reserve is undershot. Due to the current limitation of the separating device, feedback effects on consumers connected to the input gate of the energy supply module are prevented during the charging process. Feedback effects on consumers connected to the output gate can also be prevented by the charging apparatus.

In accordance with an advantageous embodiment of the invention, the energy supply module comprises a switching device and a control device for actuating the switching device, wherein the energy store can be connected in parallel with the input gate and the output gate via the switching device. The switching device connects or separates the energy store to/from the input gate and/or output gate, whereby the energy store can be connected and separated as required.

In accordance with a preferred embodiment of the invention, the switching device comprises a circuit arrangement comprising two transistors and two diodes, wherein the transistors are connected reversely in series and a diode is connected to each transistor, inversely to the current direction of said diode. The switching device thus has the same structure as the previously described separating device, and therefore no further details concerning the function of the switching device will be provided.

In accordance with a further embodiment of the invention, the energy supply module has a charging unit, which is arranged parallel to the switching device. It is thus possible, by means of the charging unit, to charge the energy store as required, such that the charging can be performed by way of example in a manner dependent on a power reserve of the energy supply module under consideration of the consumers connected to the output gate. To this end, the switching device is to be connected to interruption.

In accordance with a further embodiment of the invention, the rechargeable energy store comprises a capacitor module with a plurality of capacitors. A capacitor module of this type has short response times, such that consumers connected to the output gate of the energy supply module can continue to be supplied quickly in the case of faults of the power source.

In accordance with an advantageous embodiment of the invention, the capacitors are formed as electrolytic capacitors and/or double-layer capacitors.

In accordance with an advantageous embodiment of the invention, the rechargeable energy store comprises an accumulator. In particular, the accumulator is formed as a lead or lithium accumulator. Accumulators of this type are to be produced cost-effectively with a high storage capacity. The handling of such accumulators is favoured due to the fact that the charge thereof is maintained, even in the event of a separation from a charging voltage over a long period of time. The use of lithium-ion or lithium-polymer accumulators is particularly preferred.

The auxiliary energy source can be formed integrally with the energy supply module in order to provide a compact energy supply module, which can be installed with little effort. Alternatively, the auxiliary energy source is formed as a separate component, and the energy supply module comprises electrical contacts for the connection of the auxiliary energy source, whereby a simple exchange of the auxiliary energy source and a high flexibility are ensured.

In accordance with an advantageous development of the invention, the energy supply module is configured to provide an output voltage at the output gate thereof, the auxiliary energy source is configured to provide an auxiliary voltage, which is different from the output voltage, and the energy supply module has an auxiliary voltage adjustment apparatus in order to adjust the auxiliary voltage to the output voltage. An auxiliary energy source with an arbitrary auxiliary voltage can thus be used with or in the energy supply module, which increases the flexibility thereof. The auxiliary voltage adjustment apparatus can be formed integrally with the auxiliary energy source. The auxiliary voltage adjustment apparatus, as a converter step, is formed as a step-up or step-down converter in accordance with the output voltage and the auxiliary voltage. Converter steps of this type can be configured as buck converters or boost converters and are known as such to a person skilled in the art. The auxiliary voltage adjustment apparatus is preferably formed integrally with the above-mentioned switching device. In particular, the auxiliary voltage can be variable, for example when discharging chemical energy stores, and can be converted to a constant value of the output voltage.

In accordance with a further advantageous development of the invention, the energy supply module is configured for operation at an input voltage at the input gate thereof, the auxiliary energy source is configured for charging with a charging voltage, which is different from the input voltage, and the energy supply module has a charging voltage adjustment apparatus in order to adjust the input voltage to the charging voltage. A chargeable auxiliary energy source can thus be used with any charging voltage with or in the energy supply module, which increases the flexibility thereof. The charging voltage adjustment apparatus can be formed integrally with the auxiliary energy source. The charging voltage adjustment apparatus, as a converter step, is configured as a step-up or step-down converter depending on the input voltage and the charging voltage. Converter steps of this type can be configured as buck or boost converters and are known as such to a person skilled in the art. The charging voltage adjustment apparatus is preferably formed integrally with the above-mentioned switching device. The charging voltage adjustment apparatus is further preferably formed integrally with the auxiliary voltage adjustment apparatus. The charging voltage and auxiliary voltage are preferably identical, however they may also be different. In particular, the charging voltage may be variable, for example in order to optimise the charging process in the case of chemical energy stores.

In accordance with an advantageous development of the invention, the energy supply module comprises a capacitor, which is connected between the separating device and the output gate parallel thereto. The capacitor is configured with a high storage capacity and quickly covers the energy demand of consumers connected to the output gate in the case of input voltage drops. In the case of drops of the input voltage, a quick actuation of the separating device is therefore necessary.

The invention also relates to the use of an electrical separating device comprising two transistors and two diodes, wherein the transistors are connected reversely in series and a diode is connected to each transistor, inversely to the current direction of said diode, in an energy supply module between an input gate for connection to a power source and an output as an interruption-free power supply, wherein an auxiliary energy source is positioned between the separating device and the output gate, parallel to the input gate and the output gate.

The invention also relates to a method for operating an energy supply module of the above-mentioned type. Here, the separating device is actuated in such a way that the transistor is connected conductively in the direction of current from the input gate to the output gate when the input voltage is greater than the output voltage by a limit value, and vice versa.

This actuation can be implemented easily and in a manner unaffected by time. The corresponding diode guides the current in the current direction from the input gate to the output gate when the difference from the input voltage and the output voltage is positive, but less than the limit value. The operation of the energy supply module is thus already ensured. When the difference from the input voltage and the output voltage is greater than the limit value, the transistor can be connected conductively in order to reduce any losses occurring and in order to take over the current. When the output voltage rises again and the voltage difference falls below the limit value, the transistor is blocked, such that the diode guides the current again. As soon as the output voltage is greater than the input voltage, the diode blocks. This actuation of the energy supply module thus prevents a current flow through the separating device to the input gate in a simple and direct manner, whereby it is possible to respond automatically and efficiently to a voltage drop at the input gate. The connection of the transistor is unaffected by time, and the number of switching processes is reduced as a result of the fact that an actuation occurs merely when the limit value is exceeded or undershot.

In accordance with an advantageous development of the invention, the separating device is actuated in such a way that the transistor is connected so as to be blocking in the current direction from the output gate to the input gate when the output voltage breaks down. This actuation corresponds to an overload at the output gate, for example by means of a short circuit. In this case, the separating device is actuated in order to separate the input gate and output gate, such that feedback effects of the overload on the input side are prevented. The separation is implemented only in the direction from the input gate into the energy supply module. This protection can thus be implemented with a rapid actuation merely of the transistor in the current direction from the output gate to the input gate. This transistor is preferably configured to implement rapid switching processes.

In accordance with an advantageous development of the invention, once the transistor has been blocked in the current direction from the output gate to the input gate, the separation device is actuated in such a way that the transistor is connected conductively in the current direction from the output gate to the input gate with a predefined frequency. Due to the repeated connection of the transistor, it is checked whether the overload is still present at the output gate. As soon as the overload has been overcome, the operation of the energy supply module is re-started.

The invention will be explained in greater detail hereinafter with reference to accompanying drawing on the basis of preferred embodiments.

In the drawing

Figure 2:
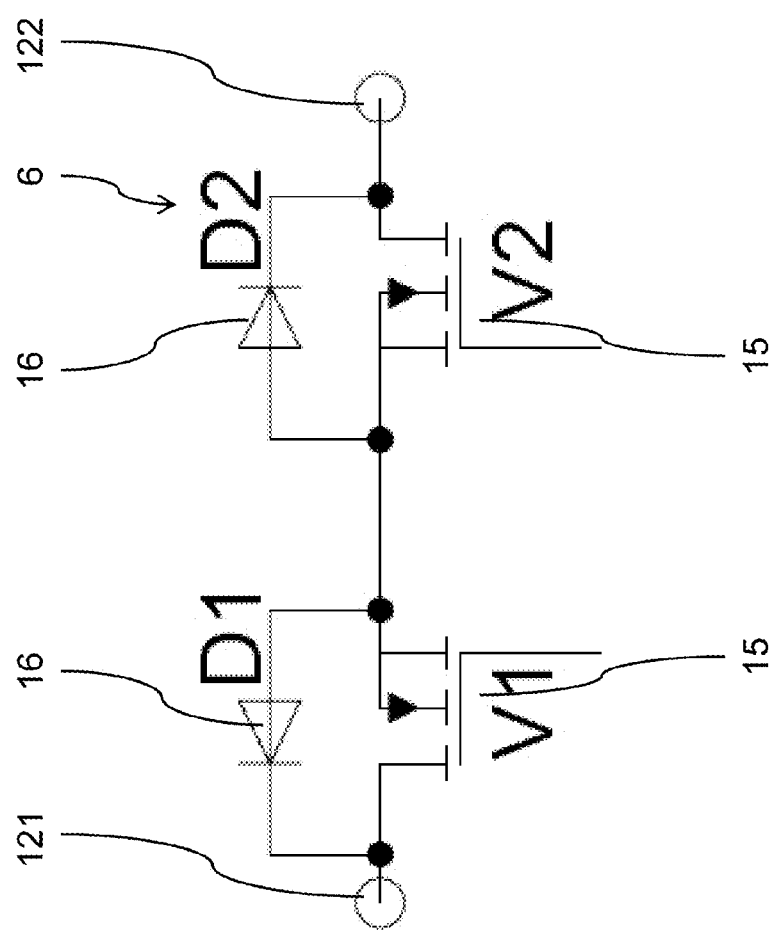
Figure 3:
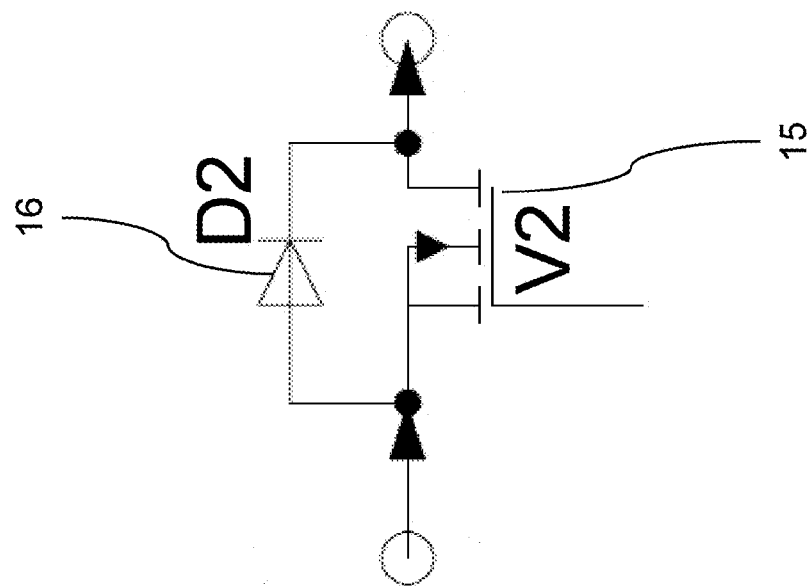
Figure 5:
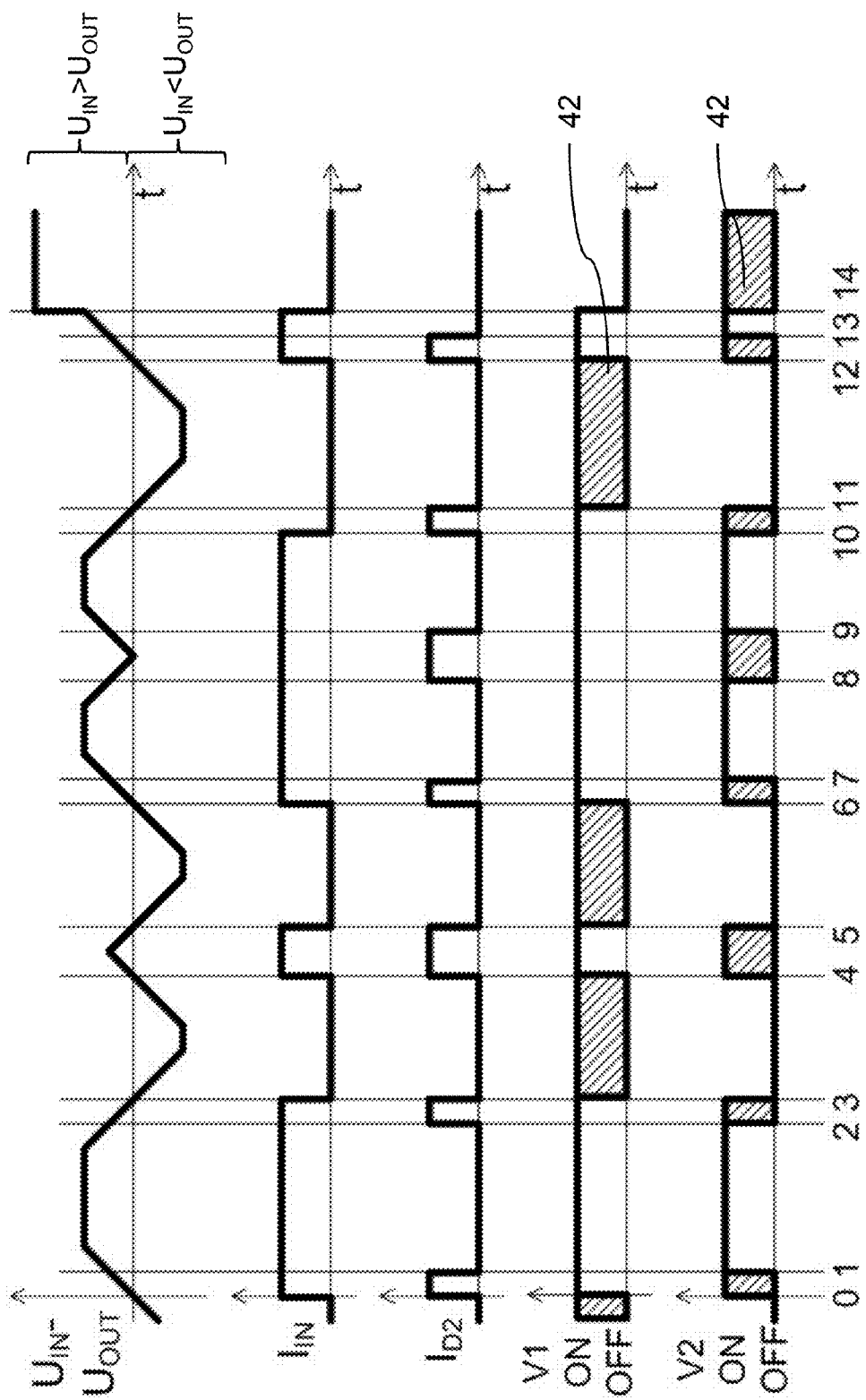
Figure 6:
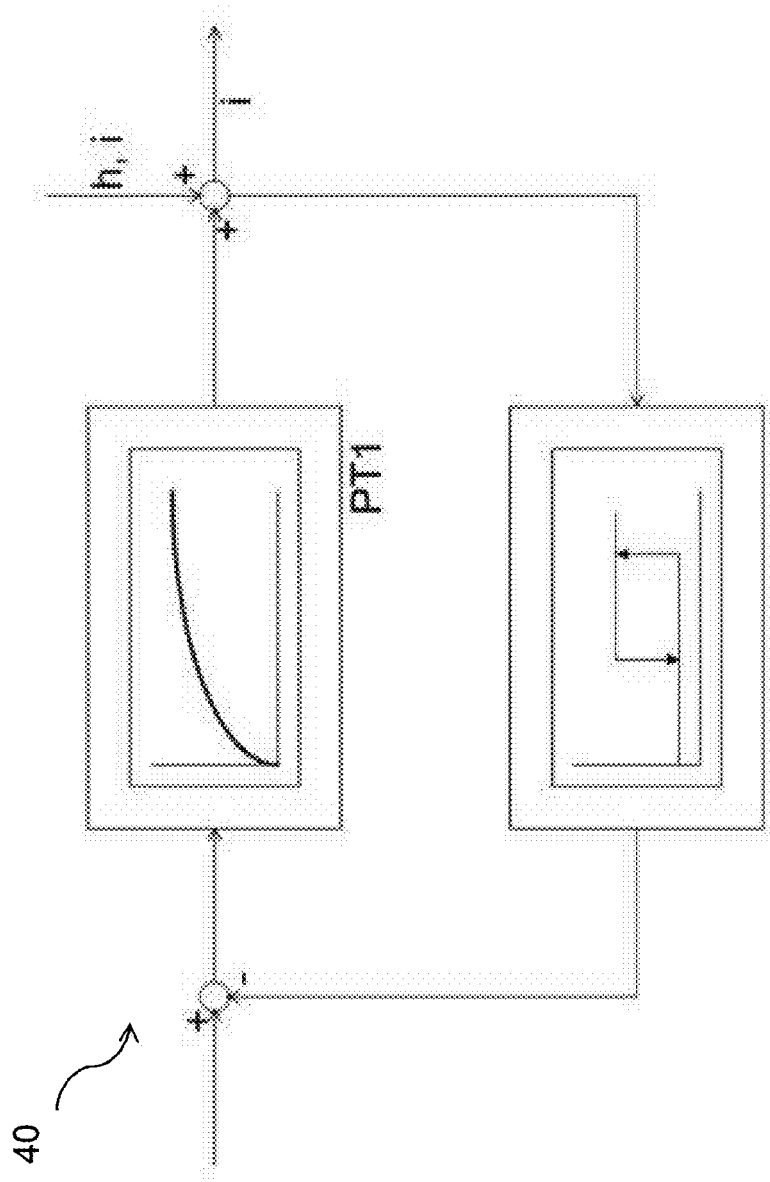
Figure 7:
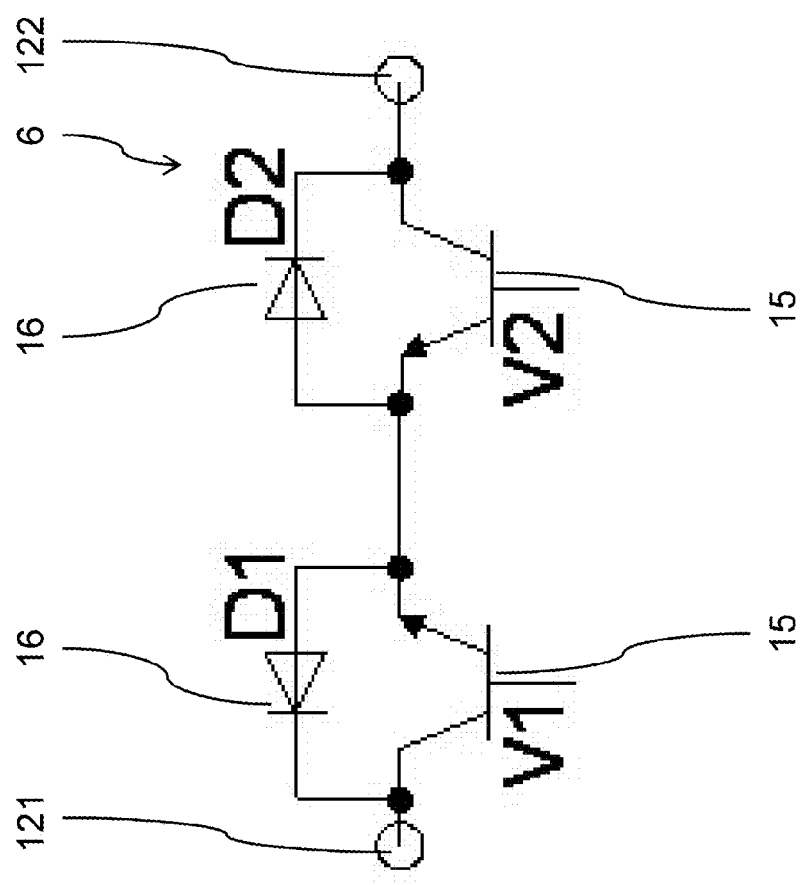
Figure 8:
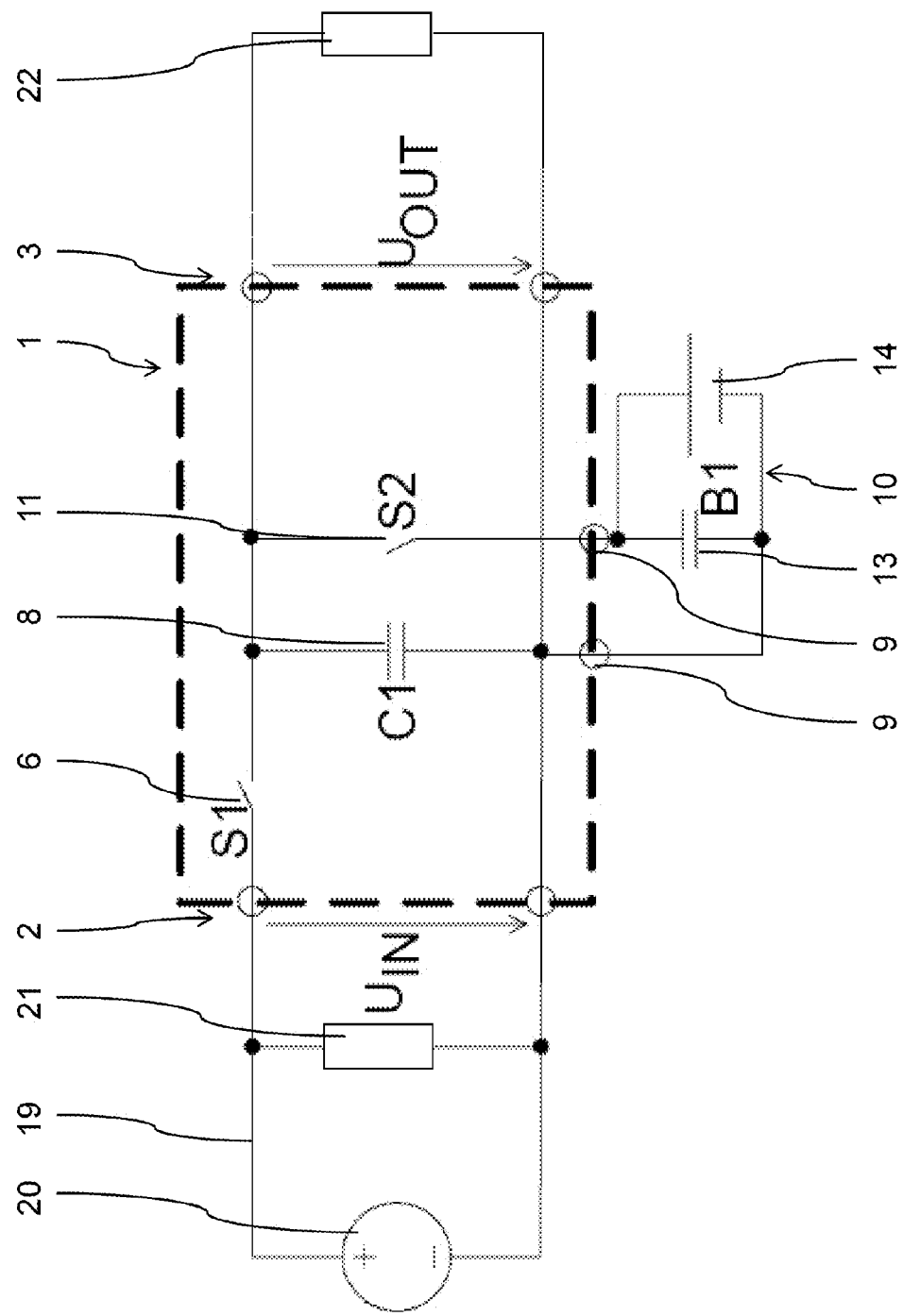
Figure 9:
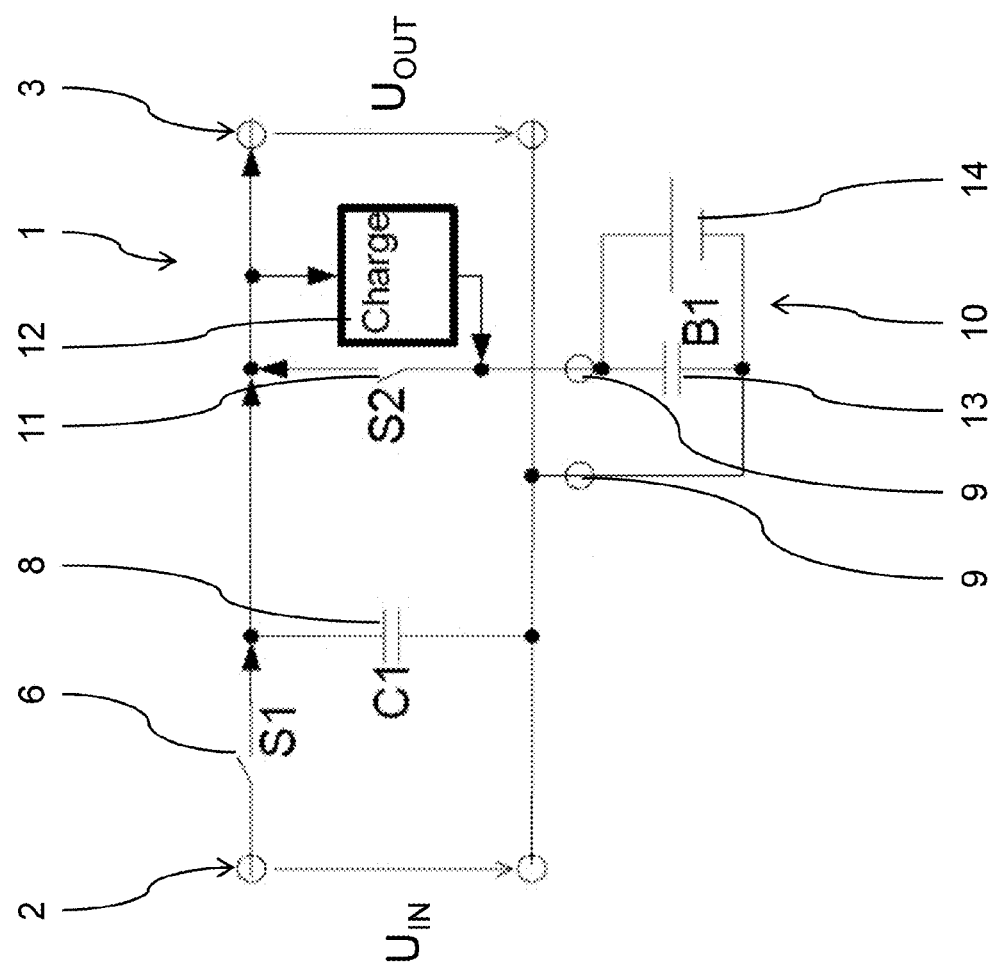
Figure 10:
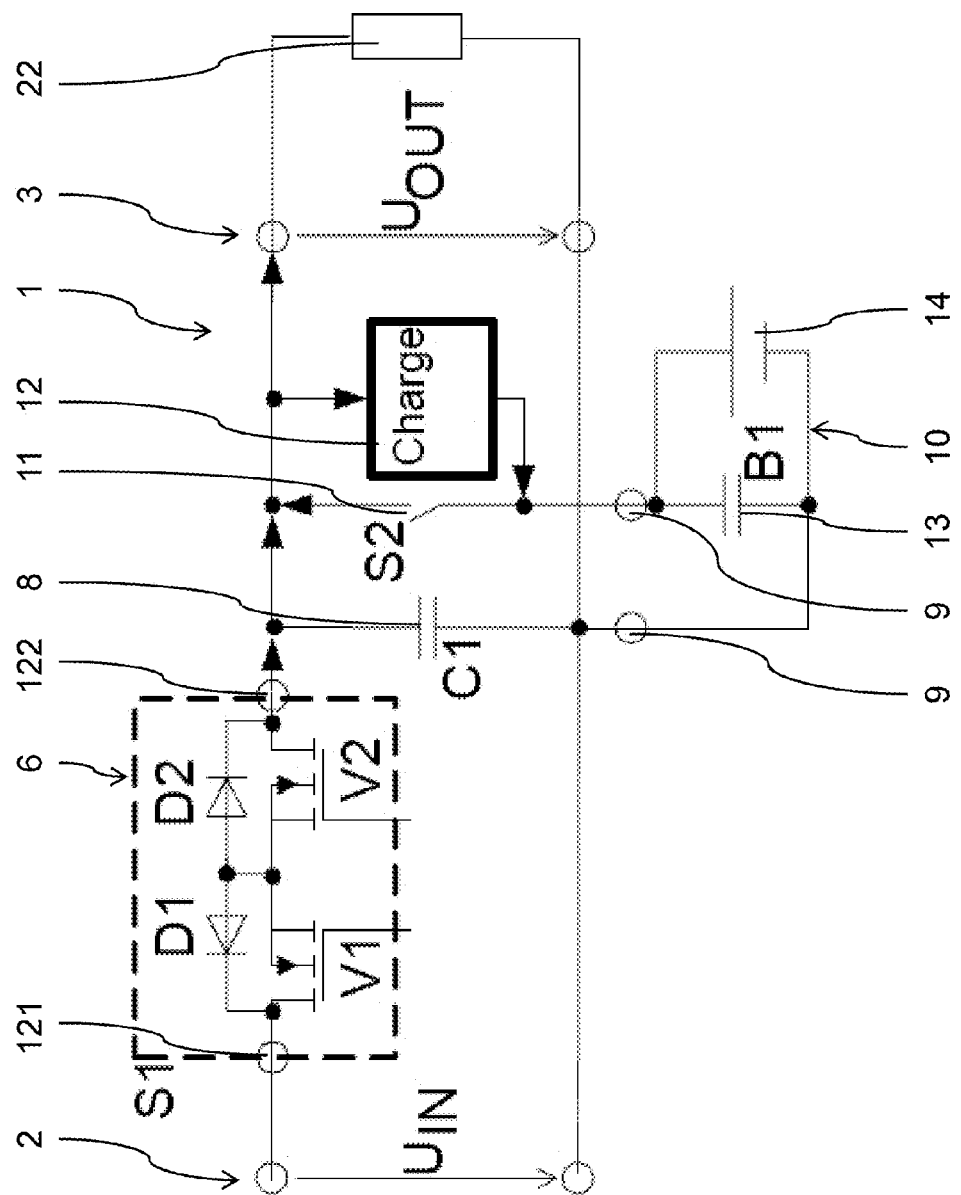
Figure 11:
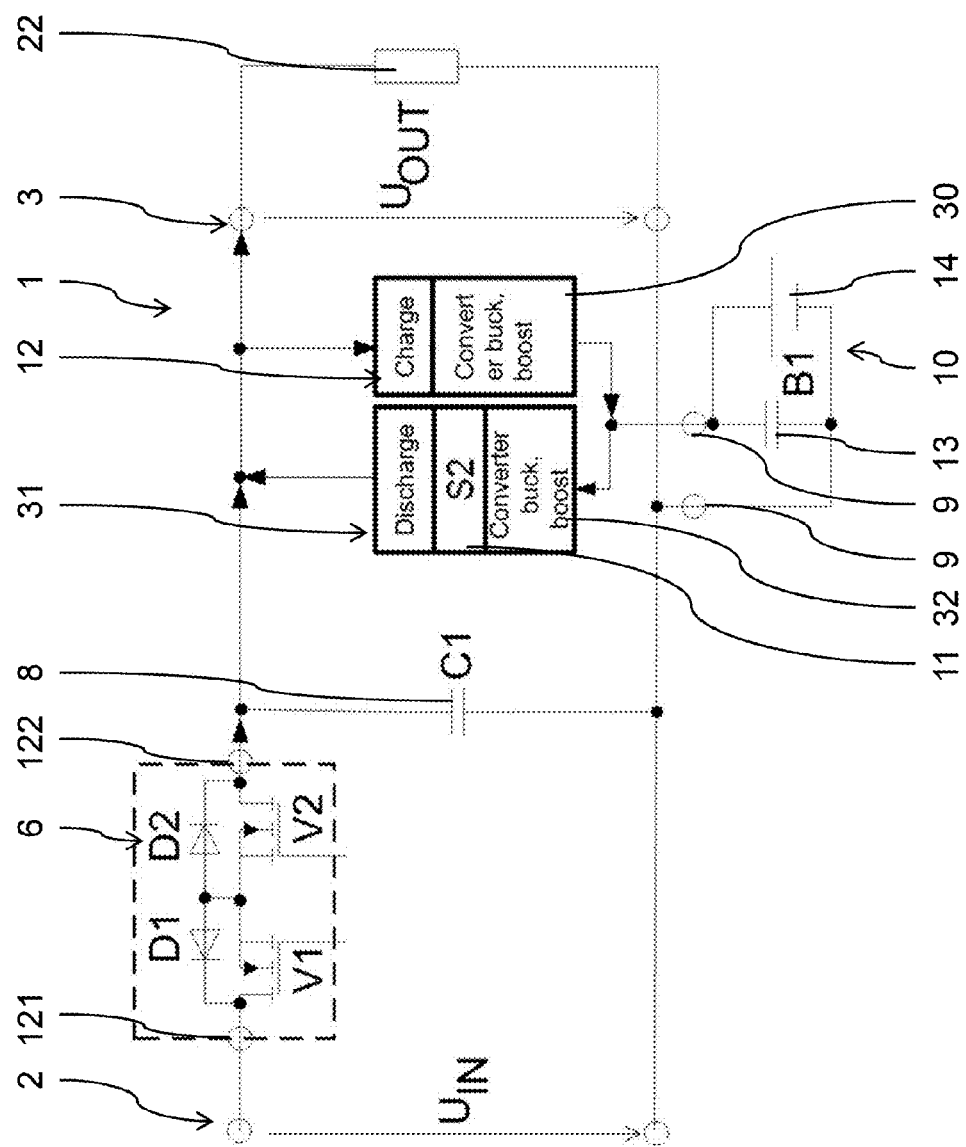

FIG. 1 shows a circuit diagram of an energy supply module according to the invention with an auxiliary energy source in accordance with a first embodiment with input-side and output-side wiring, FIG. 2 shows a circuit diagram of a detailed view of a separating device of the energy supply module from FIG. 1 in accordance with the first embodiment of the invention, FIG. 3 shows a circuit diagram of a detailed view of the separating device in accordance with FIG. 2 in accordance with the first embodiment of the invention, FIG. 4 shows a table, which shows the states of the individual transistors and diodes of the separating device and switching device of the first embodiment, FIG. 5 shows a time graph, which shows, by way of example, the switched states of the transistors of the separating device depending on a difference of input voltage and output voltage of the energy supply module of the first embodiment, FIG. 6 shows a schematic illustration of a PID controller for actuating the separating device from FIG. 2, FIG. 7 shows a circuit diagram of a detailed view of a separating device of the energy supply module in accordance with a second embodiment of the invention, FIG. 8 shows a circuit diagram of an energy supply module with an auxiliary energy source in accordance with a third embodiment of the invention with input-side and output-side wiring, FIG. 9 shows a circuit diagram of an energy supply module with an auxiliary energy source in accordance with a fourth embodiment of the invention, FIG. 10 shows the circuit diagram of the energy supply module from FIG. 9 with separating apparatus shown in detail, and FIG. 11 shows a circuit diagram of an energy supply module in accordance with a fifth embodiment.

FIGS. 1 to 6 concern an energy supply module 1 in accordance with a first embodiment of the invention. The energy supply module 1 is configured with input gate 2 and an output gate 3. The input gate 2 and the output gate 3 are through-connected separably via an electrical separating device 6. An input voltage $U_{IN}$ is applied across the input gate 2 and an output voltage $U_{OUT}$ is applied across the output gate 3, and said voltages are substantially identical in an unseparated state.

The energy supply module 1 is connected separably via electrical contacts 9 to an auxiliary energy source 10, such that the auxiliary energy source 10 can be easily exchanged as required. The auxiliary energy source 10 is configured in this exemplary embodiment as a rechargeable energy store, more specifically as an accumulator 14. Said auxiliary energy source is connected via the contacts 9 between the separating device 6 and the output gate 3 in parallel with the input gate 2 and the output gate 3. A switching device 11 is introduced in the connection between the auxiliary energy source 10 and the gates 2, 3, and the auxiliary energy source 10 can be separated from the gates 2, 3 by means of said switching device.

In an alternative embodiment, the energy supply module 1 is formed integrally with the auxiliary energy source 10. Accordingly, the contacts 9 are formed as internal contacts for the connection of the auxiliary energy source 10. For the rest, the function of the energy supply module 1 is the same as the alternative embodiment as described previously.

The structure of the separating device 6 and also of the switching device 11 will be described hereinafter in detail. The separating device 6 and the switching device 11 are structured identically in principle, and therefore the structure thereof will be described jointly. The separating device 6 and the switching device 11, in this exemplary embodiment, which is shown in detail in FIGS. 2 and 3, each comprise two transistors 15, which are formed in the first exemplary embodiment as field-effect transistors, and two diodes 16. The transistors 15 are connected reversely in series, wherein a diode 16 is connected to each transistor 15, inversely to the current direction of said diode. In this exemplary embodiment, the transistors 15 are formed as N-channel MOSFETs, wherein the use of P-channel MOSFETs is also possible in an alternative embodiment.

The energy supply module 1 further comprises a control device (not shown), which controls the separating device 6 and the switching device 11. The control device is configured in particular to detect the input current and/or voltage $U_{IN}$ at the input gate 2 of the energy supply module 1 and to actuate the separating device 6 in the case of fluctuations of current and/or voltage at the input gate 2 in order to separate the input gate 2 from the output gate 3. In addition, the control device is configured to actuate the switching device 11 in order to provide the output voltage $U_{OUT}$ at the output gate 3 via the auxiliary energy source in the case of fluctuations of current and/or voltage at the input gate 2. Furthermore, the control device is configured to charge the accumulator 14 via the input gate 2. The control device comprises a PID controller 40, which is illustrated in FIG. 6.

The separating device 6 and the switching device 11 can be blocked completely via the control device, can be connected so as to each be connected conductively in one direction, or can be bidirectionally conductively connected with low loss, as can be seen from the table in FIG. 4. In the table, the individual transistors 15 and diodes 16, as characterised in FIGS. 2 and 3, are distinguished as V1, V2 and D1, D2 respectively. Details concerning the operation will be described hereinafter with additional reference to FIG. 5.

FIG. 1 shows the energy supply module 1 in the connected state for operation of the output gate 3 as an interruption-free power supply. The energy supply module 1 is connected via a supply line 19 to a power source 20. The power source 20 is configured to provide a direct current. An input-side load 21 is additionally connected between the input gate 2 of the energy supply module 1 and the power source 20, and an output-side load 22 is additionally connected to the output gate 3.

The control device is configured to cover the energy demand of the output-side load 22 via the auxiliary energy source 10 in the case of the failure of the power source 20. Here, it is necessary for the separating device 6 to quickly block in order to prevent a flow of current from the auxiliary energy source 10 via the input gate 2 and to operate the output-side load 22 without interruption. Compensating currents in the case of fluctuations of the input voltage $U_{IN}$ at or with use of a highly inductive power source 4 are also suppressed.

The control device is furthermore configured to conductively connect the switching device 11 in the case of the failure of the power source 20. The auxiliary energy source 10 is thus connected to the output-side load 22 and supplies this in the manner of an interruption-free power supply. Accordingly, the auxiliary voltage applied across the contacts 9 is provided as an output voltage $U_{OUT}$ at the output gate 3. The operation of the output-side load 22 is thus maintained. As soon as the correct function of the power source 20 is determined by the control device, the output-side load 22 is fed again from the power supply 20 via the separating device 6, and the switching device 11 separates the auxiliary energy source 10. The switching device 11 is additionally actuated by the control device in order to charge the auxiliary energy source 10 at the power source 20.

A method for operating the separating device 6 will be described hereinafter in detail with reference to FIGS. 4 and 5.

In one operating state, the input voltage $U_{IN}$ is greater than the output voltage $U_{OUT}$. Accordingly, a difference between the input voltage $U_{IN}$ and the output voltage $U_{OUT}$ lies above a limit value, as is the case by way of example between the moments in time 1 and 2 in FIG. 5. Accordingly, the transistors 15 are both conductively connected by the control device, and the separating device 6 is located in the "bidirectionally conductive, low loss" operating state in accordance with the table in FIG. 4.

In one operating state, which is present by way of example between the moments in time 2 and 3 in FIG. 5, the input voltage $U_{IN}$ is greater than the output voltage $U_{OUT}$. However, the difference between the input voltage $U_{IN}$ and the output voltage $U_{OUT}$ is below the limit value. Accordingly, the transistor 15 characterised by V2 is connected in a blocking manner by the control device. The current flows again through the diode 16 characterised by D2, and the separating device 6 is operated in the "unidirectionally conductive from 121 to 122" state in accordance with the table in FIG. 4.

As soon as the output voltage $U_{OUT}$ is greater than the input voltage $U_{IN}$, the diode 16 characterised by D2 blocks automatically, and a flow of current through the input gate 2 in the direction to the input-side load 21 and the power source 20 is prevented. By way of example, this concerns the moment in time 3 in FIG. 5.

Following the moment in time 3, the transistor 15 characterised by V1 is connected so as to be blocking in a manner unaffected by time. The separating device 6 is thus in the "bidirectionally blocking" operating state in accordance with the table in FIG. 4. This state is changed by a conductive switching, unaffected by time, of the transistor 15 characterised by V1 by the control device prior to the moment in time 4 in FIG. 5 back into the "unidirectionally conductive from 121 to 122" state, as described previously.

As soon as the input voltage $U_{IN}$ is greater again than the output voltage $U_{OUT}$, the flow of current from the power source 20 through the input gate 2 in the direction to the output gate 3 is automatically released by the diode 15 characterised by D2, and therefore the output-side load 22 is supplied again by the power source 20. This occurs by way of example at the moment in time 4 in FIG. 5.

When the difference between the input voltage $U_{IN}$ and the output voltage $U_{OUT}$ rises again above the limit value, for example as is the case at the moment in time 7 in FIG. 5, a change is made again into the "bidirectionally conductive, low loss" operating state in order to reduce the losses.

Hatched areas 42, which are shown in FIG. 5, in each case represent the changes to the operating states, unaffected by time, as described above.

At the moment in time 14 in FIG. 5, a short circuit occurs at the output gate 3 due to the output-side load 22, whereby the output is overloaded. In order to reduce the voltage drop at the input gate 2, the transistor 15 characterised by V1 is opened and the flow of current from the power source 20 is interrupted by the separating device 6. By means of a rapid actuation of the transistor 15 characterised by V1 by the control device, the power source 20 is protected, and the input-side load 21 can continue to be operated by the power source 20. The separating device 6 initially functions "unidirectionally conductively from 122 to 121" in accordance with table 4. With disconnection of the transistor 15 characterised by V2 by the control device, the separating device 6 acts in a bidirectionally blocking manner.

Following the moment in time 14 in FIG. 5, the transistor 15 characterised by V1 is conductively connected by the control device with a predefined frequency in order to examine the behaviour of the output-side load 22. Here, the transistor 15 characterised by V1 can be clocked at low or high frequency. As soon as the short circuit has been overcome, a change is made back into the operation of the energy supply module 1 in order to supply the output-side load 22.

Similarly to the previously described operation of the separating device 6 by the control device, a failure of the power source 20 is detected thereby. In addition, the supply of the output-side load 22 by the auxiliary energy source 10 by actuation of the switching device 11 is started in this case by the control device. Following the end of the failure, the switching device 11 is actuated by the control device in order to terminate the supply of the output-side load 22 by the auxiliary energy source 10.

Various embodiments of modified energy supply modules 1 will be described hereinafter. The modified energy supply modules 1 correspond substantially to the energy supply module previously described, and therefore only the differences between the respective embodiments will be discussed hereinafter. Accordingly, identical reference signs will be used for like or similar components.

A second exemplary embodiment, which is shown in FIG. 7, differs from the first merely by the embodiment of the transistors 15 of the separating device 6 and of the switching device 11. In this exemplary embodiment, the transistors 15 are configured as NPN bipolar transistors. Alternatively, the use of PNP bipolar transistors is also possible.

A third exemplary embodiment of the invention is shown in FIG. 8. The third exemplary embodiment differs from the first merely by an additional capacitor 8 and the embodiment of the auxiliary energy source 10. The capacitor 8 is positioned parallel to the input gate 2 and the output gate 3 between the separating device 6 and the output gate 3. The auxiliary energy source 10 in detail comprises a capacitor module 13 and an accumulator 14. The capacitor module 13 comprises a plurality of capacitors (not shown here individually), which are formed as electrolytic capacitors or double-layer capacitors. The accumulator 14 is configured in this exemplary embodiment as a lead accumulator. In an alternative embodiment, the accumulator 14 is configured as a lithium accumulator.

The control device is configured in the third exemplary embodiment so as to cover the energy demand of the output-side load 22 initially via the capacitor 8 in the case of the failure of the power source 20. It is therefore necessary for the control device to actuate the separating device 6 quickly in order to prevent a flow of current from the capacitor 8 via the input gate 2. Compensating currents through the capacitor 8 in the case of fluctuations of the input voltage $U_{IN}$ or with the use of a highly inductive power source 4 are thus also suppressed.

In accordance with the third embodiment, the auxiliary energy source 10 is also connected by means of the switching device 11 to the output-side load 22 and supplies this in the manner of an interruption-free power supply. Accordingly, the auxiliary voltage applied across the contacts 9 is provided as an output voltage $U_{OUT}$ at the output gate 3. The operation of the output-side load 22 is thus maintained. As soon as the correct function of the power source 20 is determined by the control device, the switching device 11 is switched back again, and the output-side load 22 is supplied by the power source 20. In addition, the auxiliary energy source 10 is charged via the switching device 11 by the power source 20.

An energy supply module 1 in accordance with a fourth embodiment is shown in FIGS. 9 and 10. The energy supply module 1 of the fourth embodiment corresponds substantially to that of the third embodiment and additionally comprises a charging unit 12, which is arranged parallel to the switching device 11. The charging unit 12 is used to charge the auxiliary energy source 10 via the input gate 2. An auxiliary voltage is applied across the contacts 9, and in this exemplary embodiment corresponds substantially to the input or output voltage $U_{IN}$, $U_{OUT}$. The level of the input voltage $U_{IN}$ is thus delivered both as charging voltage in order to charge the auxiliary energy source 10 and also as auxiliary voltage in the event of discharge of the auxiliary energy source 10 and can be applied across the output gate 3 directly as output voltage $U_{OUT}$.

An energy supply module 1 will be described in accordance with a fifth embodiment of the invention with reference to FIG. 11. In FIG. 11, the energy supply module 1 is shown with an auxiliary energy source 10 and a consumer 22 attached on the output side.

The auxiliary energy source 10 of the fifth embodiment is configured for operation with an auxiliary voltage and a charging voltage at the contacts 9, said voltages being different from the input voltage $U_{IN}$ and the output voltage $U_{OUT}$. Accordingly, the charging unit 12 comprises a charging voltage adjustment apparatus 30, which is configured as a voltage converter, in order to adjust the input voltage $U_{IN}$ for the charging of the auxiliary energy source 10 to the charging voltage.

The energy supply module 1 additionally comprises a discharging unit 31, which comprises the switching device 11 of the energy supply module 1 of the first embodiment and is positioned at the same point in the energy supply module 1. The discharging unit 31 further comprises an auxiliary voltage adjustment apparatus 32, which is connected in series with the switching device 11 and which is configured as a voltage converter, in order to adjust the auxiliary voltage to the output voltage $U_{OUT}$.

LIST OF REFERENCE SIGNS energy supply module 1
input gate 2
output gate 3
separating device 6
capacitor 8
contacts 9
auxiliary energy source, rechargeable energy store 10
switching device 11
charging unit 12
capacitor module 13
accumulator 14
transistors 15
diode 16
supply line 19
power source 20
input-side load 21
output-side load 22
charging voltage adjustment apparatus 30
discharging unit 31
auxiliary voltage adjustment apparatus 32
PID controller 40
hatched area 42
first switch contact 121
second switch contact 122

The invention claimed is:

1. An energy supply module comprising;
an input gate for connection to a power source and an output gate configured as an interruption-free power supply, wherein the input gate and the output gate are through-connected separably via an electrical separating device, and
an auxiliary energy source connected or configured for connection in parallel with the input gate and the output gate, wherein the separating device is positioned between the auxiliary energy source and the input gate, wherein the auxiliary energy source comprises a rechargeable energy store,
wherein the energy supply module is configured to charge the energy store via the input gate,
wherein the energy supply module has a charging unit, which is arranged parallel to the switching device such that the auxiliary energy source can be charged by the charging unit via the input gate, and
wherein the separating device comprises a circuit arrangement having two transistors and two diodes, wherein the transistors are connected reversely in series, and a diode is connected to each transistor, inversely to the current direction of said diode.

2. The energy supply module according to claim 1, wherein the transistors are configured as bipolar transistors or field-effect transistors.

3. The energy supply module according to claim 1, wherein the energy supply module comprises a switching device and a control device for actuating the switching device, wherein the energy store can be connected via the switching device in parallel with the input gate and the output gate.

4. The energy supply module according to claim 3, wherein the switching device comprises a circuit arrangement having two transistors and two diodes, wherein the transistors are connected reversely in series and a diode is connected to each transistor, inversely to the current direction of said diode.

5. The energy supply module according to claim 1, wherein the rechargeable energy store comprises a capacitor module having a plurality of capacitors.

6. The energy supply module according to claim 5, wherein the capacitors are configured as electrolytic capacitors and/or double-layer capacitors.

7. The energy supply module according to claim 1, wherein the rechargeable energy store comprises an accumulator.

8. The energy supply module according to claim 1, wherein:
the energy supply module is configured to provide an output voltage ($U_{OUT}$) at the output gate thereof,
the auxiliary energy source is configured to provide an auxiliary voltage, which is different from the output voltage ($U_{OUT}$), and
the energy supply module has an auxiliary voltage adjustment apparatus in order to adjust the auxiliary voltage to the output voltage ($U_{OUT}$).

9. The energy supply module according to claim 1, wherein:
the energy supply module is configured for operation at an input voltage ($U_{IN}$) at the input gate thereof,
the auxiliary energy source is configured for charging with a charging voltage, which is different from the input voltage ($U_{IN}$), and
the energy supply module has a charging voltage adjustment apparatus in order to adjust the input voltage ($U_{IN}$) to the charging voltage.

10. The energy supply module according to claim 1, wherein the energy supply module comprises a capacitor, which is connected between the separating device and the output gate, parallel thereto.

11. A method for using an electrical separating device comprised of two transistors and two diodes, the method comprising:
configuring an energy supply module, which includes an input gate for connection to a power source, an output gate and an auxiliary energy source connected or configured for connection in parallel with the input gate and the output gate, as an interruption-free power supply, wherein the input gate and the output gate are through-connected separably via the electrical separating device;
connecting the transistors reversely in series; and
connecting a diode to each transistor, inversely to the current direction of each diode;
wherein the separating device is positioned between the auxiliary energy source and the input gate;
wherein the auxiliary energy source comprises a rechargeable energy store;
wherein the energy supply module is configured to charge the energy store via the input gate;
wherein the energy supply module has a charging unit, which is arranged parallel to the switching device such that the auxiliary energy source can be charged by the charging unit via the input gate; and
wherein an auxiliary energy source is positioned parallel to the input gate and the output gate between the separating device and the output gate.

12. A method for operating an energy supply module according to claim 1, the method comprising:
actuating the separating device in such a way that the transistor is conductively connected in the current direction from the input gate to the output gate when the input voltage ($U_{IN}$) is greater than the output voltage ($U_{OUT}$) by a limit value, and vice versa.

13. The method according to claim 12, further comprising:
actuating the separating device in such a way that the transistor is connected so as to be blocking in the current direction from the output gate to the input gate when the output voltage ($U_{OUT}$) breaks down.

14. The method according to claim 13, further comprising:
following the blocking of the transistor in the current direction from the output gate to the input gate, actuating the separating device in such a way that the transistor is conductively connected in the current direction from the output gate to the input gate with a predefined frequency.

15. The energy supply module according to claim 2, wherein:
the auxiliary energy source comprises a rechargeable energy store, and
the energy supply module is configured to charge the energy store via the input gate.

16. The energy supply module according to claim 4, wherein the energy supply module has a charging unit, which is arranged parallel to the switching device.

17. The energy supply module according to claim 3, wherein the rechargeable energy store comprises a capacitor module having a plurality of capacitors.

18. The energy supply module according to claim 3, wherein the rechargeable energy store comprises an accumulator.

19. The energy supply module according to claim 9 wherein the energy supply module comprises a switching device and a control device for actuating the switching device, wherein the energy store can be connected via the switching device in parallel with the input gate and the output gate.

20. The energy supply module according to claim 10 wherein:
the energy supply module is configured to provide an output voltage ($U_{OUT}$) at the output gate thereof,
the auxiliary energy source is configured to provide an auxiliary voltage, which is different from the output voltage ($U_{OUT}$), and
the energy supply module has an auxiliary voltage adjustment apparatus in order to adjust the auxiliary voltage to the output voltage ($U_{OUT}$).

* * * * *